(12) United States Patent
Perry

(10) Patent No.: US 10,258,070 B1
(45) Date of Patent: Apr. 16, 2019

(54) FLAVOR INFUSED PEANUTS

(71) Applicant: Boden Jay Perry, West Warwick, RI (US)

(72) Inventor: Boden Jay Perry, West Warwick, RI (US)

(*) Notice: Subject to any disclaimer, the term of this patent is extended or adjusted under 35 U.S.C. 154(b) by 78 days.

(21) Appl. No.: 15/235,698

(22) Filed: Aug. 12, 2016

Related U.S. Application Data

(60) Provisional application No. 62/204,652, filed on Aug. 13, 2015.

(51) Int. Cl.
| | | |
|---|---|---|
| *A23L 25/00* | (2016.01) |
| *A23B 9/00* | (2006.01) |
| *A23N 12/04* | (2006.01) |
| *A23N 12/08* | (2006.01) |
| *A23B 9/30* | (2006.01) |

(52) U.S. Cl.
CPC .............. *A23L 25/20* (2016.08); *A23N 12/04* (2013.01); *A23N 12/08* (2013.01); *A23B 9/30* (2013.01); *A23L 25/00* (2016.08); *A23V 2002/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 713,918 | A * | 11/1902 | Potter ..................... | A23L 25/20 426/460 |
| 1,397,187 | A * | 11/1921 | Tucker .................... | A23L 25/20 426/281 |
| 1,637,068 | A * | 7/1927 | Willison ................ | A23L 3/0155 426/506 |
| 2,278,467 | A * | 4/1942 | Musher ................... | A23P 30/32 426/417 |
| 2,643,190 | A * | 6/1953 | Hageman ................ | A23L 25/20 426/632 |
| 3,457,087 | A * | 7/1969 | Renner ................... | A23L 25/20 426/438 |
| 4,049,833 | A * | 9/1977 | Gannis .................... | A23L 25/20 426/93 |
| 4,085,230 | A * | 4/1978 | Green ..................... | A23L 25/25 426/262 |
| 4,113,889 | A * | 9/1978 | Baxley ................... | A23L 25/20 426/455 |
| 4,206,246 | A * | 6/1980 | Mamahit ................ | A23L 25/20 426/507 |
| RE30,651 | E * | 6/1981 | Green ..................... | A23L 25/25 426/262 |
| 4,597,973 | A | 7/1986 | Moore | |
| 4,769,248 | A | 9/1988 | Wilkins et al. | |
| 4,931,304 | A | 6/1990 | Sharma | |
| 5,718,936 | A | 2/1998 | Porter et al. | |

(Continued)

*Primary Examiner* — Michele L Jacobson
(74) *Attorney, Agent, or Firm* — Salter & Michaelson

(57) ABSTRACT

A method for infusing a nut snack by immersing it in an aqueous flavoring solution and baking/roasting the moistened product to the desired texture, crunch, and appearance. The process not only enhances the flavor of the nut, it also produces a nut with no exterior residue. The method includes such steps as providing a portion of blanched nuts; adding the blanched nuts to water and a flavoring component in order to infuse the flavoring into the nuts; cooking the flavored nuts for a predetermined period of time to enhance the infusion process; rinsing the cooked nuts; and roasting the nuts.

14 Claims, 1 Drawing Sheet

(56) References Cited

U.S. PATENT DOCUMENTS

| | | | | |
|---|---|---|---|---|
| 6,090,433 | A * | 7/2000 | Sterner | A23L 11/10 |
| | | | | 426/309 |
| 6,274,189 | B1 * | 8/2001 | Kazemzadeh | A23P 30/20 |
| | | | | 426/425 |
| 6,572,907 | B1 * | 6/2003 | Gorang | A23L 25/20 |
| | | | | 426/309 |
| 6,908,637 | B2 * | 6/2005 | Meibach | A23L 11/32 |
| | | | | 426/431 |
| 7,078,067 | B2 | 7/2006 | Latha et al. | |
| 7,081,264 | B2 * | 7/2006 | Akashe | A23L 11/32 |
| | | | | 426/431 |
| 8,216,623 | B2 | 7/2012 | Anand et al. | |
| 8,435,579 | B2 | 5/2013 | Smyth et al. | |
| 8,445,054 | B2 | 5/2013 | Reddy et al. | |
| 8,771,769 | B2 | 7/2014 | Smyth et al. | |
| 9,078,467 | B2 * | 7/2015 | Cea | A23L 1/362 |
| 2010/0310739 | A1 * | 12/2010 | Smyth | A23B 9/30 |
| | | | | 426/281 |
| 2016/0331018 | A1 * | 11/2016 | Nunez | A23P 30/30 |

* cited by examiner

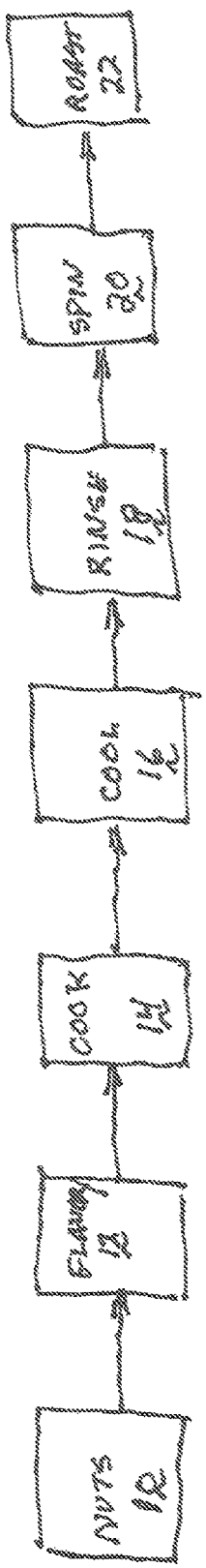

FLAVOR INFUSED PEANUTS

RELATED CASE

Priority for this application is hereby claimed under 35 U.S.C. § 119(e) to commonly owned and U.S. Provisional Patent Application No. 62/204,652 which was filed on Aug. 13, 2015 and which is incorporated by reference herein in its entirety.

FIELD OF THE INVENTION

The present invention relates in general to a method for making a flavored nut, particularly for a flavored peanut. More particularly, the present invention relates to an improved flavored nut formed by a novel infusion process that provides the nut flavor along with the infused substance flavor.

BACKGROUND OF THE INVENTION

There is a global need for health conscious people to enjoy an affordable, healthy, natural snack. The method of the present invention employing an infused peanut process makes this viable. Peanuts have been proven to have high fiber which reduces the risk of digestive disorders, heart disease, diabetes, and some cancers. The "no mess" exterior of the infused peanut affords a snack that is easily enjoyed on the run by everyone from busy professionals to soldiers in the field.

Accordingly, it is an object of the present invention to provide an improved infusion process in making the product.

Another object of the present invention is to provide a process that targets machine blanched raw peanuts that are modified with desired peanut flavors by infusion.

SUMMARY OF THE INVENTION

To accomplish the foregoing and other objects, features and advantages of the present invention, the method that is described herein has the benefit of infusing the peanut so that there is no residue on the exterior surface of the nut. In this way the consumer enjoys a clean, natural, healthy snack. The flavor experience of the enhanced infused peanut is also of benefit to the consumer as the first taste the palate enjoys is the actual taste of the peanut, and then the pleasant surprise of the infused flavoring.

In accordance with one aspect of the present invention, the infusion of the peanut gives the consumer a natural, healthy, affordable snack. The machine blanched raw peanut is introduced to an aqueous flavoring solution heated to a minimum of 212 degrees Fahrenheit. The peanut is then rested in the aqueous flavoring solution for a period of time. This rest period has been found to be critical in providing proper infusion. Thereafter the peanut is rinsed in cold water and then baked. No oils or topical flavorings are used. The displacement of the peanut's natural oils is replaced with the aqueous flavoring solution. The flavor of the peanut is preserved on the exterior surface and is the initial flavor the consumer enjoys. Thus, the flavor enhancement is quickly enjoyed by the palate. There is no oily residue; the texture of the roasted peanut is not compromised.

The present invention is described in terms of both a method or process as well as a system or apparatus for performing a process for infusing a flavoring into a nut. The basic process includes the steps of:

providing a portion of blanched nuts;
add the blanched nuts to water and a flavoring component in order to infuse the flavoring into the nuts;
cook the flavored nuts for a predetermined period of time to enhance the infusion process;
rinse the cooked nuts; and
roast the nuts.

In accordance with other aspects of the present invention the nuts are immersed in the solution of the water and flavoring; the cooking step may be over a period of 10-40 minutes; alternatively, the cooking step may be over a period on the order of 20 minutes; the roast step is in an oven at a temperature in a range of 200-225 degrees F.; the roast step is, alternatively, in an oven at successive temperature ranges that include a higher temperature range followed by a lower temperature range for roasting; the higher temperature range may be 300-450 degrees F., and the lower temperature range may be 175-275 degrees F.; further including a step of cooling the nuts after the cooking step; wherein the cooling step is for a period of time in a range of 25-60 minutes; wherein the cooling step is for a period of time on the order of 40 minutes; including a step of spinning the nuts after the rinsing step to remove excess water; wherein the spinning occurs by means of a centrifugal apparatus; the roasting step is performed in an oven at a temperature range of 200-225 degrees F.; the roasting step may be for a period on the order of 18 hours; the roasting step occurs in successive steps at on the order of 400 degrees F. followed by on the order of 200 degrees F.; wherein the roasting step at on the order of 400 degrees F. occurs over a smaller period of time than the roasting step at on the order of 200 degrees F.; wherein the period of time at 400 degrees F. is less than 10 minutes and the period of time at 200 degrees F. is less one hour or more; and wherein the rinse step includes draining and rinsing.

In accordance with the system or apparatus of the present invention there is provided a system for infusing a flavoring into a nut and comprising:

a container for machine blanched nuts;
water and a flavoring component added into the container;
a burner or other heat source upon which the container rests and for the purpose of boiling the water and flavoring component in order to cook the flavored nuts for a predetermined period of time;
the container being removed from the burner after the predetermined period of time to enable a cooling of the nuts;
a spinner for receiving the nuts and water and used for the purpose of removing moisture;
and a roasting oven for the nuts;
the roasting oven operates preferably first at a higher temperature and then successively at a lower temperature.

BRIEF DESCRIPTION OF THE DRAWING

It should be understood that the drawing is provided for the purpose of illustration only and is not intended to define the limits of the disclosure. The foregoing and other objects and advantages of the embodiments described herein will become apparent with reference to the following detailed description when taken in conjunction with the accompanying drawing which is a block diagram illustrating the method of the present invention.

DETAILED DESCRIPTION

There is now provided a series of examples that illustrate the concepts of the present invention. This includes s method of making a flavorful, crunchy nut snack by immersing machine blanched raw peanuts in an aqueous flavoring solution to fully expand and absorb desired flavor, resting to a cool down state, and baking/roasting the moistened nuts.

In one embodiment in accordance with the present invention the machine blanched raw nuts are immersed in an aqueous flavoring solution heated to a temperature of at least 212 degrees Fahrenheit. The product is then cooked for a period of time at which the nut fully expands to absorb the desired flavoring. The cooking period of time may be anywhere from 10 to 40 minutes and preferably on the order of 20 minutes. Once flavoring is fully absorbed the nut is removed from the heat source and rested for a cool down period or from about 25 to 60 minutes and preferably on the order of 40 minutes. This cool down period has been found to be important in enabling a desired infusion.

Once the allotted cool down time has expired the nuts are rinsed to remove all surface aqueous flavoring solution and then transferred to a spinner/centrifuge. The centrifugal force removes excess moisture from the product which reduces the baking/roasting time. The nut is immediately placed in an oven/roaster that has been preheated to a minimum of 200 degrees Fahrenheit for the final stage of preparation. Due to removal of excess moisture while cooking, the nut releases its natural oils while maintaining the desired flavor. After the allotted cook time and period of cool down a crunchy, flavorful snack is presented, free of any and all exterior residue. The actual nut flavor precedes the desired infused flavor of the nut which results in a total reversal of the palate process.

Reference is now made to the block diagram that illustrates the steps employed in accordance with the process and method of the present invention. The machine blanched raw nuts are illustrated at 10. The nuts are immersed in an aqueous flavoring solution indicated at 12 in the illustrated block diagram. Various flavor substances can be used some of which are set forth hereinafter. A container can be used for the nuts, water and flavoring. After the immersion the nuts are heated at step 12 to a temperature of at least 212 degrees Fahrenheit. This heating may be by means of a burner or other heating source. The product is thus cooked at step 14 for a period of time at which the nut fully expands to absorb the desired flavoring. The cooking period of time may be anywhere from 10 to 40 minutes and preferably on the order of 20 minutes. Once flavoring is fully absorbed the nut is removed from the heat source and rested for a cool down period at step 16 or from about 25 to 60 minutes and preferably on the order of 40 minutes. This cool down period at step 16 has been found to be important in enabling a desired infusion.

Once the allotted cool down time has expired the nuts are rinsed at step 18 to remove all surface aqueous flavoring solution and then transferred to a spinner/centrifuge at step 20. The centrifugal force removes excess moisture from the product which reduces the baking/roasting time. The nut is immediately placed in an oven/roaster at step 22 that has been preheated to a minimum of 200 degrees Fahrenheit for the final stage of preparation. Due to removal of excess moisture while cooking, the nut releases its natural oils while maintaining the desired flavor.

The following are examples that illustrate the process of the present invention.

Example 1

In this example the blanched moistened nuts, after spinning, are cooked/roasted at a temperature of 180 degrees F. for an extended amount of time; such as on the order of 15-18 hours.

Example 2

Additional samples of the blanched, flavored, moistened nuts were placed in a preheated oven/roaster at 300-400 degrees F. and immediately the temp was decreased to 175-275 degrees F. for cooking. This process decreases the actual cook time due to the fact that a higher percentage of surface moisture has been removed. It has been found desirable to use an initial temperature range at the higher end (300-400 degrees F.) followed by the lower temperature range (175-350 degrees F.). This tends to seal the flavor in. The cook time results vary with the product amounts.

Example 3

Blanches, flavored, moistened peanuts were baked/roasted at a 300-450 degree F. oven for an allotted amount of time to allow for surface moisture dissipation. The oven temp was then reduced and cooked at a lower temperature for the remaining cook (roast) time below 300 degrees F. and in a range of 175-275 degrees F. It has been found desirable to use an initial temperature range at the higher end (300-450 degrees F.) followed by the lower temperature range (below 300 degrees F.). This tends to seal the flavor in. The flash cook time will vary based on the product amount.

The examples above are based upon, but not limited to percentages, ratios, parts and amounts used unless otherwise indicated. The following are further examples of the particular ingredients that can be used in performing the process and method of the present invention.

Example 4

One pound blanched raw peanuts
10-80 ounces of an aqueous solution (solution includes any and all flavoring)
1-10 ounces of any and all salt and/or sugar based products.

Example 5

Actual product and percentages:
16 ounces of peanut
40 ounces of water (salt flavored only)
2-2.5 ounces of salt Example 6

Actual product and percentages:
16 ounces of peanut
32-40 ounces of water (dry ingredients or fresh produce mash)
4-6 ounces pureed/ground flavoring
2-2.5 ounces of salt/sugars Example 7

Actual product and percentages:
16 ounces of peanuts
16 ounces of desired flavor (liquid ingredients)
24 ounces of water
2-2.5 ounces salt/sugars

Example 8

The following is another example of the infusion process of the present invention:
Start with 2 lbs. Peanuts/shelled and blanched nuts
20 oz. water
18 oz. Hot Sauce
4 oz. Salt

Process of Example 8

Add water and salt in saucepan, boil until salt dissolves
Add hot sauce and bring to boil
Add peanuts and boil for 20 minutes
Remove from burner and let sit for 40 minutes
Drain and rinse the peanuts
Spin for a period of 7 minutes to remove excess water
Bake in preheated oven at 200 degrees for 18 hours
Let cool for 30 minutes
Actual cook time for previously identified examples given:
Example 1—oven temperature is 200-225 degrees F. Cook time approximately 18 hours.
Example 2—400 degrees initial and 200 degrees F. for cook time is approximately 5 hours.
Example 3—400 degrees F. for approximately 6 minutes and 200 degrees F. for 1-2 hours.

Having now described a limited number of embodiments of the present invention, I should now be apparent to those skilled in the art that numerous other embodiments and modifications thereof are contemplated as falling within the scope of the present invention, as defined by the appended claims. The flavoring can be of any type including but not limited to a fruit flavor, berry flavor, vegetable flavor, sauce flavors or other known flavors.

What is claimed is:

1. A process for flavoring a nut and comprising the steps of:
providing a portion of blanched nuts;
infusing a flavoring component into the nuts by immersing the blanched nuts into water along with the flavoring component in order to infuse the flavoring component into the nuts to thus form a flavored solution;
cooking the flavored solution for a predetermined period of time to enhance the infusion of the flavoring component;
after the cooking step, including a step of cooling the nuts by resting the cooked aqueous flavored solution for 25-60 minutes;
after the resting step, rinsing the cooked nuts in water to remove any surface aqueous flavoring solution; and
roasting the rinsed nuts.

2. The process of claim 1 wherein the cooking step is over a period of 10-40 minutes.

3. The process of claim 2 wherein the cooking step is over a period on the order of 20 minutes.

4. The process of claim 1 wherein the roasting step is in an oven at a temperature in a range of 200-225 degrees F.

5. The process of claim 1 wherein the roasting step is in an oven at successive temperature ranges that include a higher temperature range followed by a lower temperature range for roasting.

6. The process of claim 5 wherein the higher temperature range is 300-450 degrees F., and the lower temperature range is 175-275 degrees F.

7. The process of claim 1 wherein the cooling step is for a period of time on the order of 40 minutes.

8. The process of claim 1 including a step of spinning the nuts after the rinsing step to remove excess water.

9. The process of claim 8 wherein the spinning occurs by means of a centrifugal apparatus.

10. The process of claim 1 wherein the roasting step is for a period on the order of 18 hours.

11. The process of claim 1 wherein the roasting step occurs in successive steps at on the order of 400 degrees F. followed by on the order of 200 degrees F.

12. The process of claim 11 wherein the roasting step at on the order of 400 degrees F. occurs over a smaller period of time than the roasting step at on the order of 200 degrees F.

13. The process of claim 12 wherein the period of time at 400 degrees F. is less than 10 minutes and the period of time at 200 degrees F. is less one hour.

14. The process of claim 1 wherein the rinsing step includes draining and rinsing.

* * * * *